United States Patent
Kida

(10) Patent No.: US 6,559,434 B1
(45) Date of Patent: May 6, 2003

(54) IMAGE READING APPARATUS INCLUDING DIVIDED BACKING PLATE

(75) Inventor: Shigeru Kida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 09/707,797

(22) Filed: Nov. 8, 2000

(30) Foreign Application Priority Data

Nov. 12, 1999 (JP) ............................................. 11-322045

(51) Int. Cl.[7] ................................................. A01J 27/00
(52) U.S. Cl. ........................ 250/208.1; 355/75; 358/475
(58) Field of Search ........................ 250/208.1; 358/471, 358/474, 475, 483, 494, 496; 355/82, 83, 84, 75

(56) References Cited

U.S. PATENT DOCUMENTS 3,994,582 A * 11/1976 Goshima ..................... 355/75
5,661,571 A * 8/1997 Ijuin et al. ................... 358/471

FOREIGN PATENT DOCUMENTS

JP U60142553 9/1985

* cited by examiner

Primary Examiner—Stephone B. Allen
Assistant Examiner—Bradford Hill
(74) Attorney, Agent, or Firm—Birch, Stewart, Kolasch, & Birch, LLP.

(57) ABSTRACT

An object of the present invention is to enable manufacturing at low cost and to suppress blooming in providing an image reading apparatus using a contact image sensor. A two-piece backing plate divided into two parts in a main scanning direction of a CIS (perpendicular to the direction of movement of an original) is disposed to be opposite to the CIS. The original is advanced between the two-piece backing plate and CIS.

5 Claims, 10 Drawing Sheets

IMAGE READING APPARATUS INCLUDING DIVIDED BACKING PLATE

BACKGROUND OF THE INVENTION

1. Field of the Invention

The present invention relates to an image reading apparatus using a contact image sensor (hereinafter referred to as CIS).

2. Description of the Related Art

Conventional image reading apparatuses using a CIS include the type that uses a white backing roller and the type that uses a white backing plate, both as a backing member opposed to the CIS. An original is passed between the backing member and CIS.

In the type using a white backing roller as a backing member, as shown in FIGS. 7 and 8, originals stacked in an original stacker (not shown), are fed by a paper feeder sheet by sheet, and transported from a paper feeding section 23 through transport rollers 24 and an original guide 25 to a reading device including a CIS 22 and a backing roller 21. The backing roller 21 is rotatable to transport each original by a drive mechanism, not shown, which rotates a backing roller drive shaft 21a. Subsequently, the original leaving the reading device is guided by an original guide 27 and discharged by discharge rollers 26 to an original stacker not shown. In the type using a white backing plate as a backing member, as shown in FIGS. 9 and 10, originals stacked in an original stacker, not shown, are fed by a paper feeder sheet by sheet, and transported from a paper feeding section 23 through transport rollers 24 and an original guide 25 to a reading device including a CIS 22 and a backing plate 31. The original leaving the reading device is guided by an original guide 27 and discharged by discharge rollers 26 to an original stacker not shown.

The CIS 22 included in the reading device has a glass plate 22a defining a reading plane, light-emitting elements 22b such as an LED array, EL or the like, a sensor array 22c for performing a photoelectric conversion of an image formed, and a rod lens array 22d for imaging light reflected by the original on the image sensor array 22c. The CIS 22 is completely sealed to prevent unnecessary sensor outputs due to external light and also to prevent serious defects in image quality such as black streaks caused by entry of dust. The original is passed, face down, between the glass plate 22a defining a reading plane and the backing roller 21 or backing plate 31 placed on the glass plate 22a. As the original is passed over the glass plate 22a of CIS 22, the CIS 22 reads the original in a single scan in a main scanning direction (perpendicular to the direction of movement of the original). The entire original is read before the original completes its movement over the CIS 22. The backing roller 21 and backing plate 31 are formed of a white material or a material of a light color close to white. Areas outside the forward, rearward, left and right edges of the original are read as white. Light reflected by the backing roller is used as a reference luminosity for shading compensation to determine density levels of the light reflected by the original.

However, where, as in the conventional apparatus noted above, a white backing roller is used as the backing member, an increase in reading speed of the image reading apparatus results in a drawback of causing a friction load between the glass plate defining a reading plane of CIS 22 and the backing roller 21, and also in a drawback of increasing manufacturing costs. Where a backing plate is used as the backing member, manufacturing costs may be kept low but a gap is formed between the backing plate 31 and CIS 22 as a result of variations in curvature of CIS 22 and those due to environmental changes. There occurs a further drawback that, since the CIS 22 has a small focal depth, images read could be out of focus and bloomed.

SUMMARY

An object of the present invention is to provide an image reading apparatus which may be manufactured at low cost, and yet is effective to suppress blooming.

To fulfill the above object, the invention provides an image reading apparatus comprising a contact image sensor; and a backing plate disposed to be opposite to the contact image sensor, the backing plate being divided in a main scanning direction of the contact image sensor, an original being passed between the contact image sensor and the backing plate so that the apparatus reads an image from the original.

Thus, according to the invention, the backing plate disposed to be opposite to the contact image sensor is divided in the main scanning direction of the contact image sensor. This construction is effective to suppress a gap occurring with variations in curvature of the contact image sensor or variations in processing due to environmental changes.

Further, the invention provides an image reading apparatus comprising a contact image sensor; and a backing plate disposed to be opposite to the contact image sensor, the backing plate being formed of a flexible material, an original being passed between the contact image sensor and the backing plate so that the apparatus reads an image from the original.

Thus, according to the invention, the backing plate disposed to be opposite to the contact image sensor is formed of a flexible material. This construction also is effective to suppress a gap occurring with variations in curvature of the contact image sensor and variations in processing due to environmental changes.

Furthermore, in the invention it is preferable that pressing means is provided for pressing the backing plate against the contact image sensor.

According to the invention, the backing plate is pressed against the contact image sensor by the pressing means, thereby suppressing, with increased effect, the gap occurring with variations in curvature of the contact image sensor and variations in processing due to environmental changes.

In the invention it is preferable that shading compensation means is provided which uses white color of the backing plate as a reference for performing a shading compensation, and the shading compensation means interpolates, into a division of the backing plate, reading data of adjacent white areas among reading data obtained by the contact image sensor.

Thus, according to the invention, the shading compensation means, which uses the white color of the backing plate as a reference for performing a shading compensation, interpolates, into the division of the backing plate, reading data of adjacent white areas among reading data obtained by the contact image sensor. This prevents the division of the backing plate from affecting the shading compensation.

In the invention it is preferable that compensation means is provided to be operable, when reading data of areas other than a division of the backing plate, among reading data obtained by the contact image sensor, represents white color of the backing plate, for interpolating reading data of adjacent white areas or data representing the white color into the division of the backing plate.

Thus, accordingly to the invention, when reading data of areas other than the division of the backing plate, among reading data obtained by the contact image sensor, represent the white color of the backing plate, the compensation means interpolates reading data of adjacent white areas or data representing the white color into the division of the backing plate. This prevents the division of the backing plate from affecting image reading.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
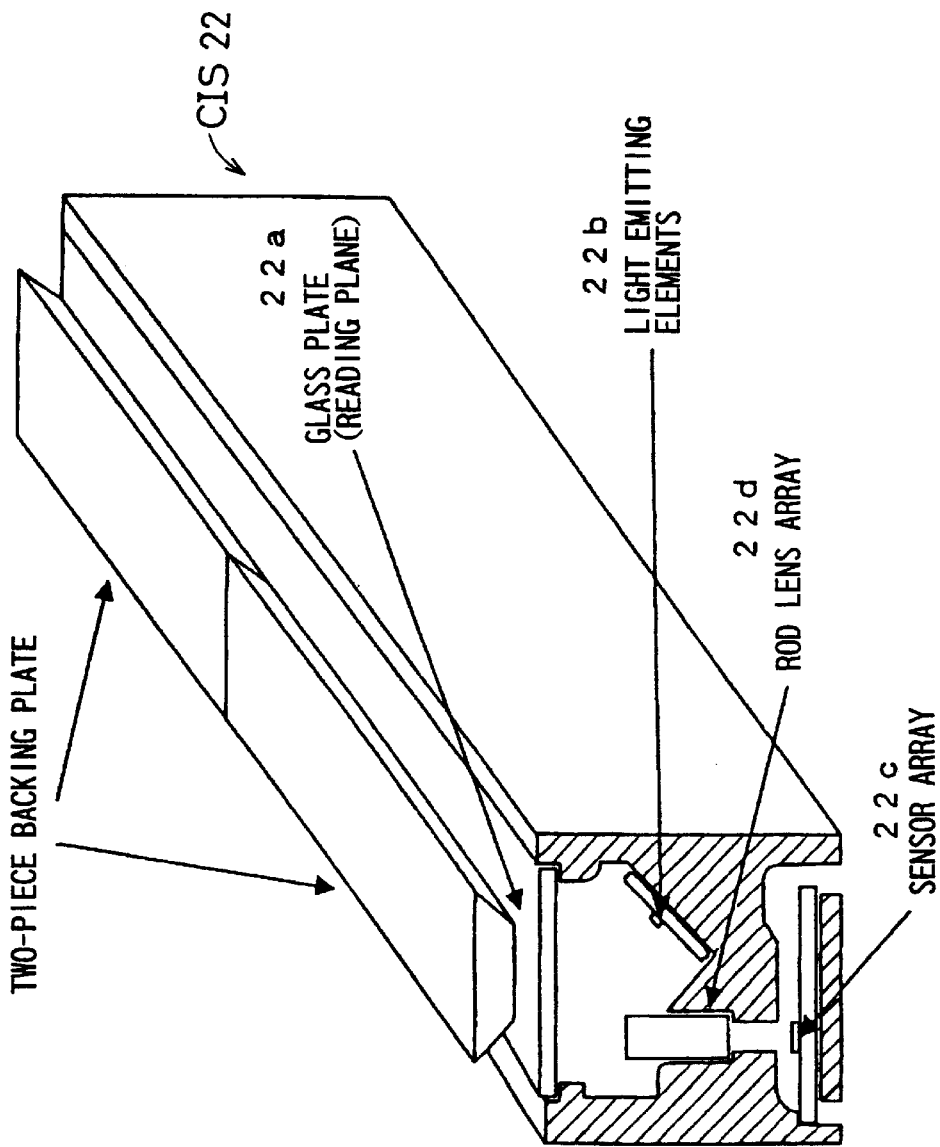
FIG. 1 is a sectional perspective view showing a reading device of an image reading apparatus in one embodiment of the invention.

Now referring to the drawings, preferred embodiments of the invention are described below.

Figure 2:
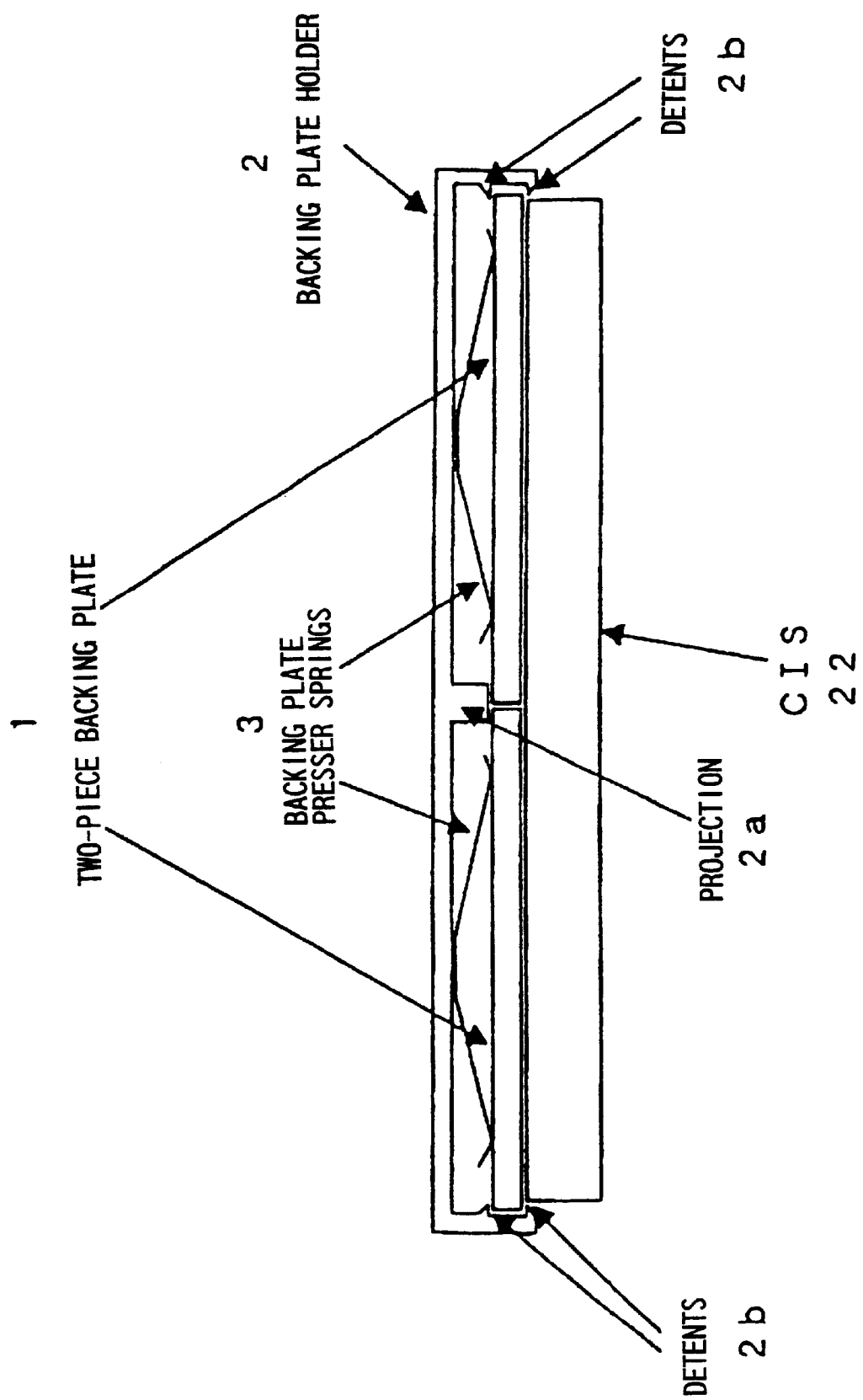
FIG. 2 is a sectional front view showing the reading device of the image reading apparatus.
Figure 3:
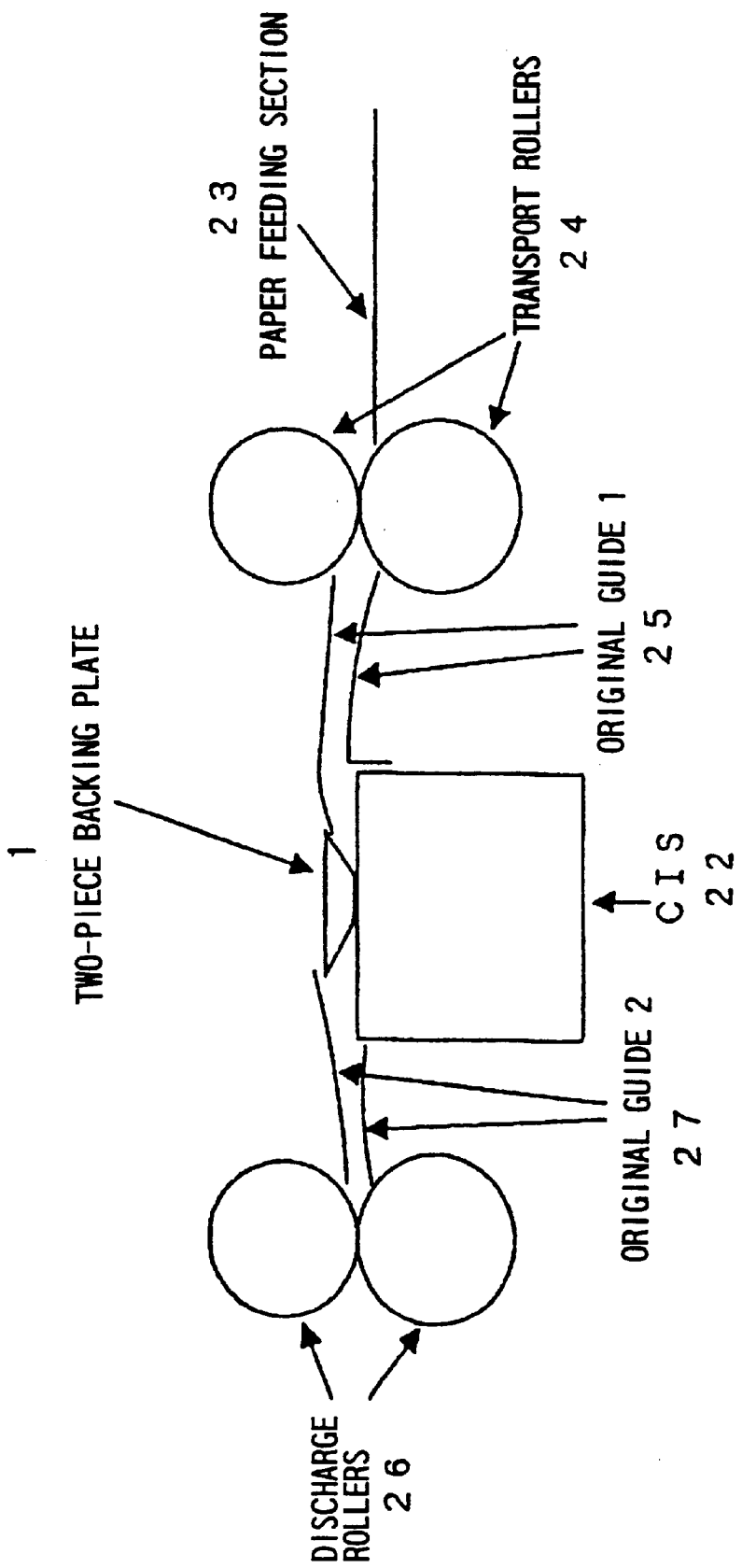
FIG. 3 is an explanatory view showing an outline of the image reading apparatus.
Figure 5:
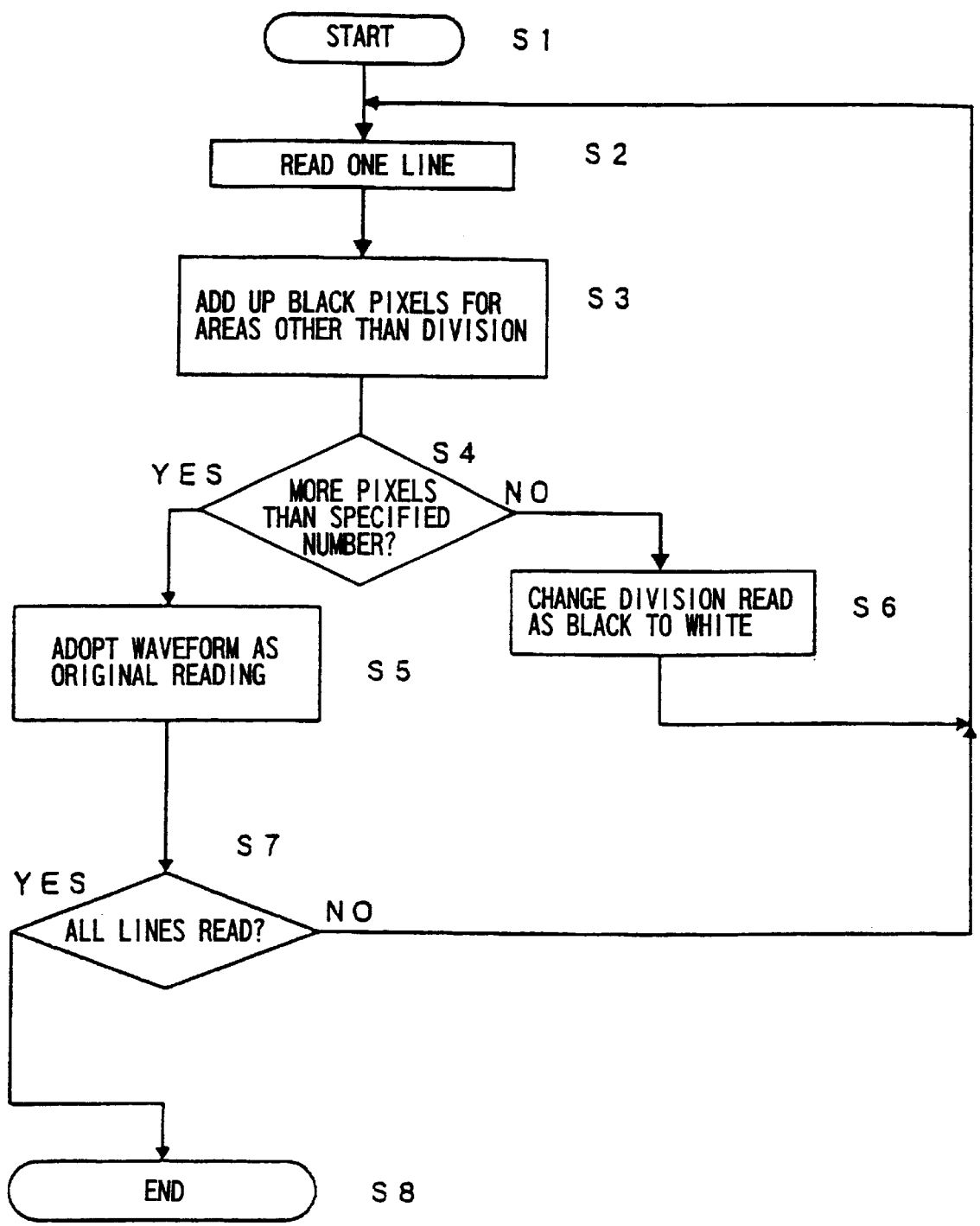
FIG. 5 is a flow chart showing operation controls of the image reading apparatus for reading an image.
Figure 6:
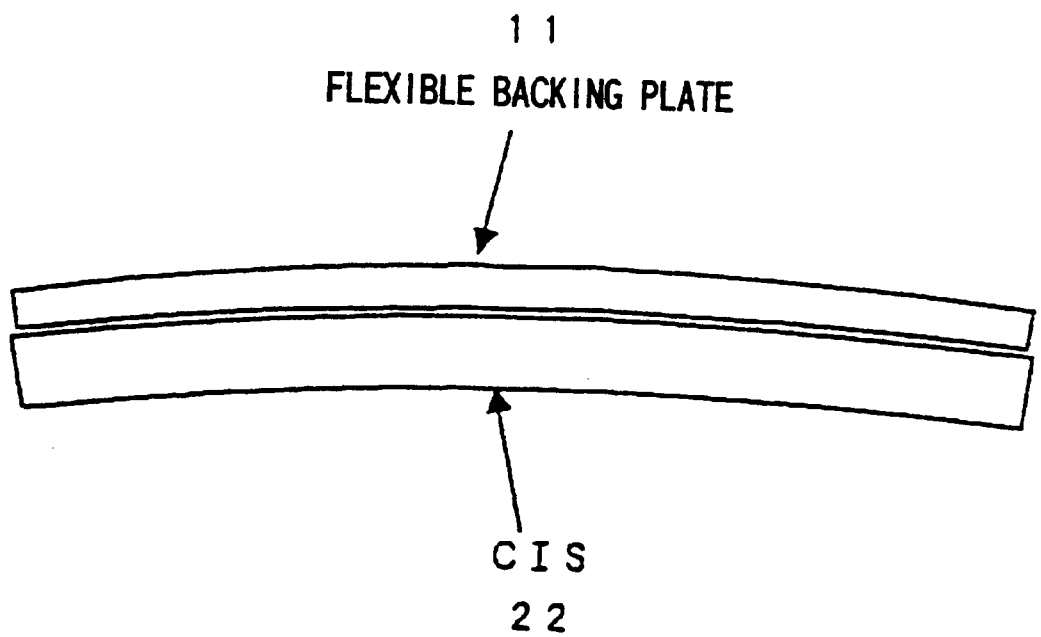
FIG. 6 is a sectional front view showing a reading device of an image reading apparatus in another embodiment of the invention.
Figure 7:
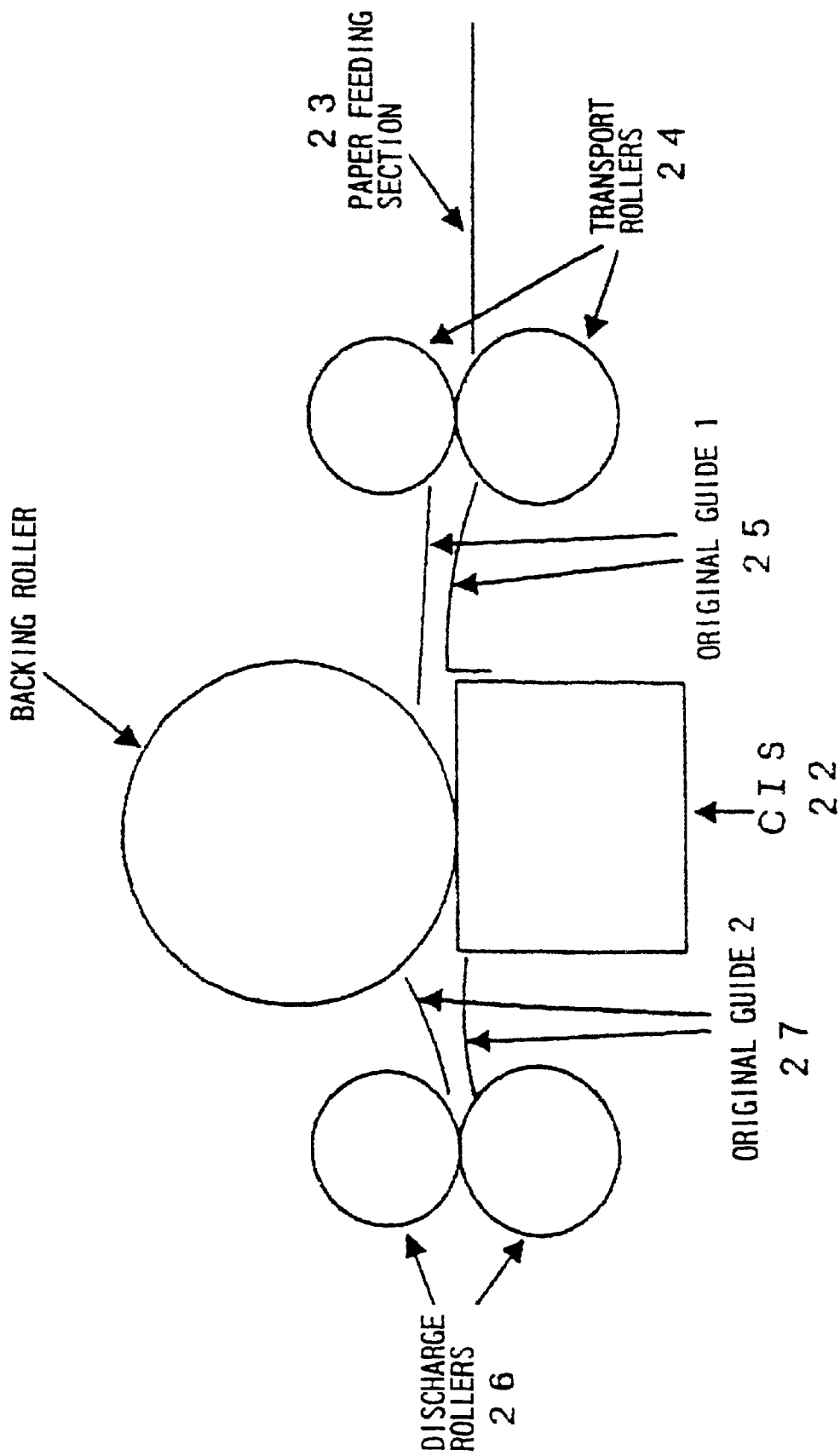
FIG. 7 is an explanatory view showing an outline of a conventional image reading apparatus.

FIG. 1 is a sectional perspective view showing a reading device of an image reading apparatus in one embodiment of the invention. FIG. 2 is a sectional front view showing the reading device of the image reading apparatus. FIG. 3 is an explanatory view showing an outline of the image reading apparatus. FIGS. 4A through 4F are sectional front views showing curvatures occurring with the reading device of the image reading apparatus and a reading device of a conventional image reading apparatus. FIG. 5 is a flow chart showing operation controls of the image reading apparatus for reading an image. FIG. 6 is a sectional front view showing a reading device of an image reading apparatus in another embodiment of the invention.

Figure 8:
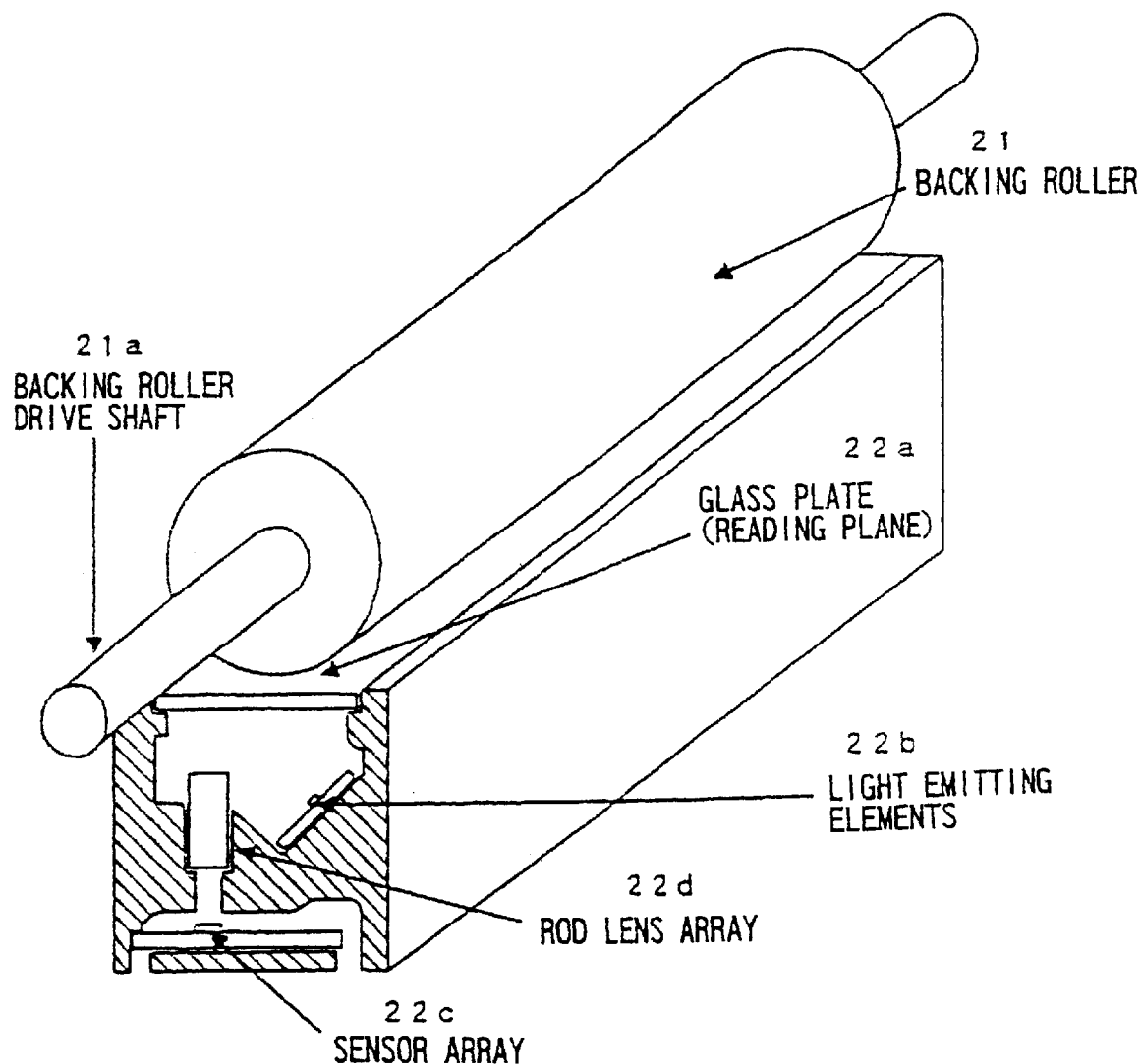
FIG. 8 is a sectional perspective view showing a reading device of the image reading apparatus shown in FIG. 7.
Figure 9:
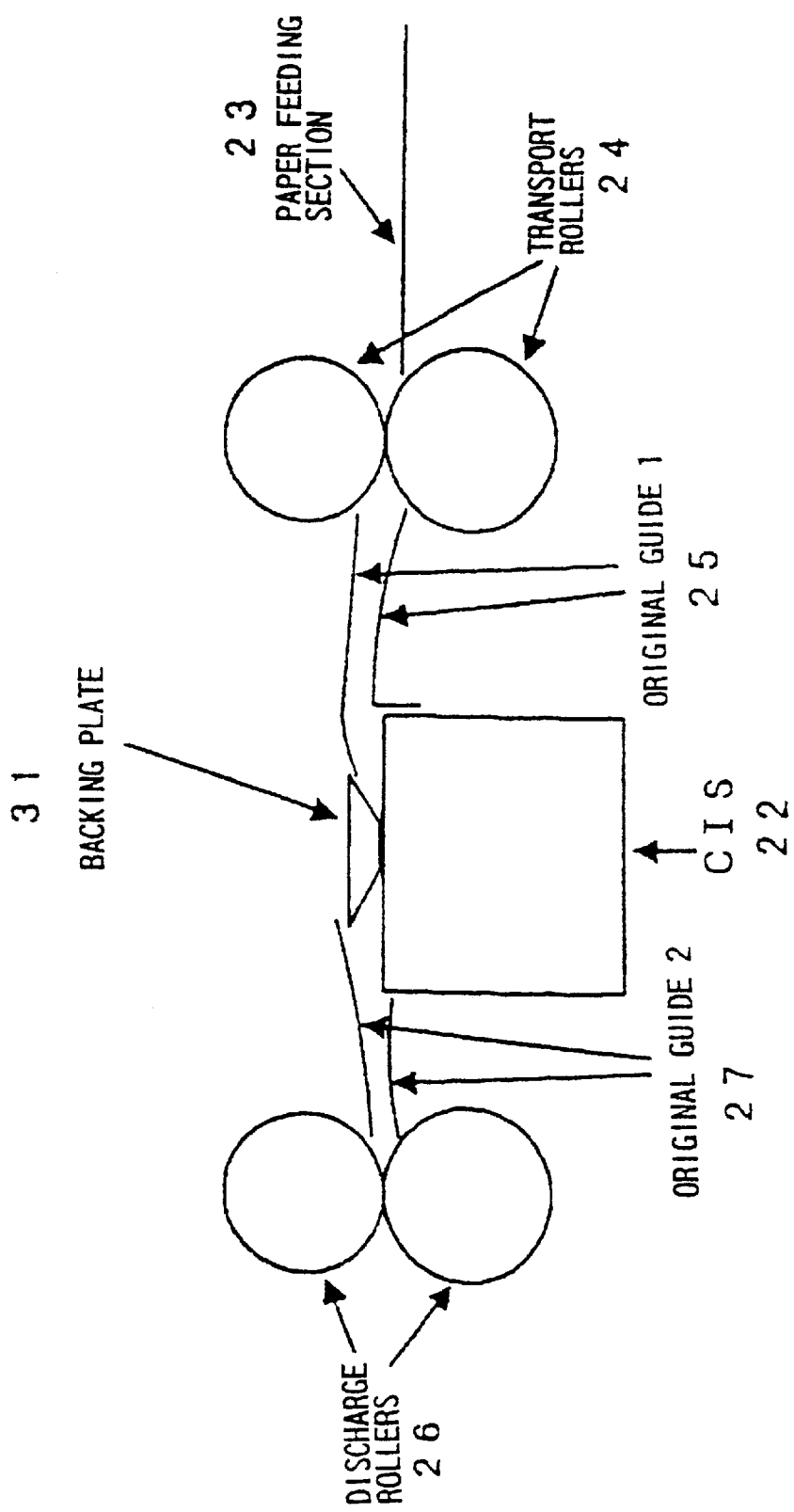
FIG. 9 is an explanatory view showing an outline of another conventional image reading apparatus.
Figure 10:
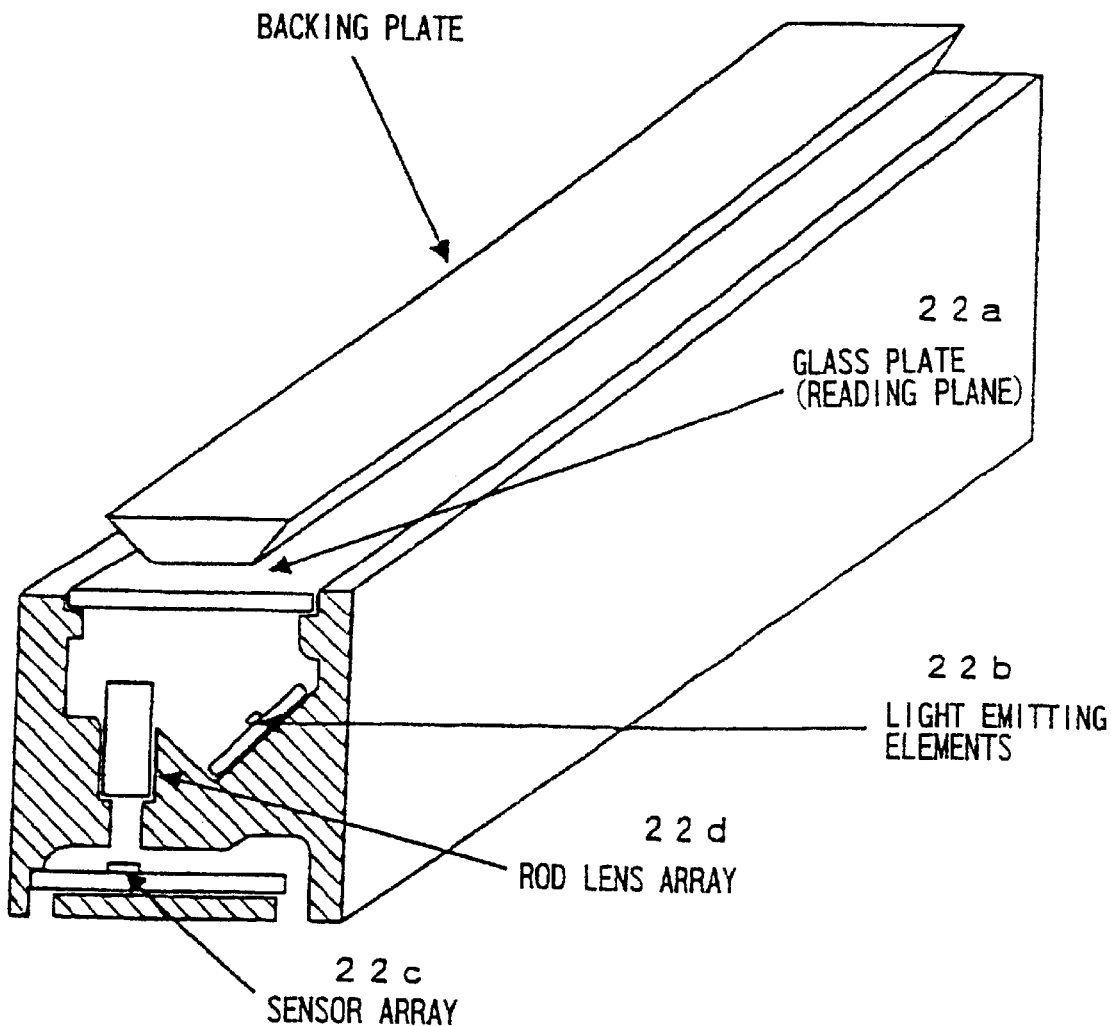
FIG. 10 is a sectional perspective view showing a reading device of the image reading apparatus shown in FIG. 9.

An original reading apparatus in one embodiment of the invention will be described hereinafter with reference to FIGS. 1 through 5. In FIGS. 1 through 5, like reference numerals are used to identify like parts in FIGS. 8 through 10 which will not be described again.

Referring to FIGS. 1 through 3, a two-piece backing plate 1 which is divided into two parts in the main scanning direction of CIS 22 (perpendicular to the original moving direction) is opposed to a glass plate 22a included in the CIS 22. A backing plate holder 2 which covers the two-piece backing plate 1 has a projection 2a for pressing on a division of the two-piece backing plate 1, and detents 2b formed peripherally of the holder 2 for restricting movement of the two-piece backing plate 1. Presser springs 3 which apply a uniform pressure to the two-piece backing plate 1 are disposed between the two-piece backing plate 1 and backing plate holder 2.

By action of the detents 2b of the backing plate holder 2 and the presser springs 3, an appropriate pressure may be selected for allowing passage of the thinnest original and causing the stiffest (i.e., thickest) original to contact the CIS 22. In particular, movement of the backing plate 1 is restricted in time of passage of an especially stiff original.

Figure 4A:
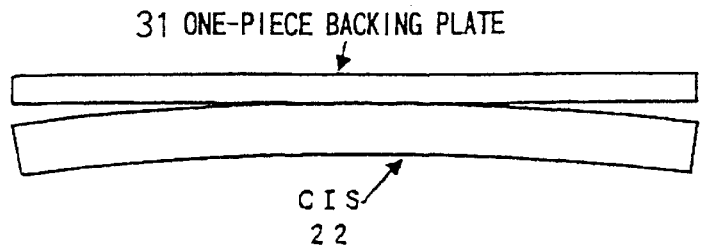
FIGS. 4A through 4F are sectional front views showing curvatures occurring with the reading device of the image reading apparatus and a reading device of a conventional image reading apparatus.
Figure 4B:
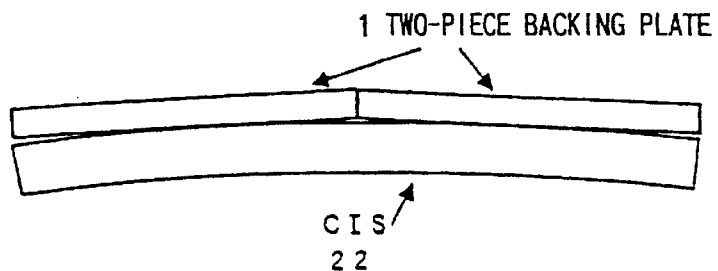
Figure 4C:
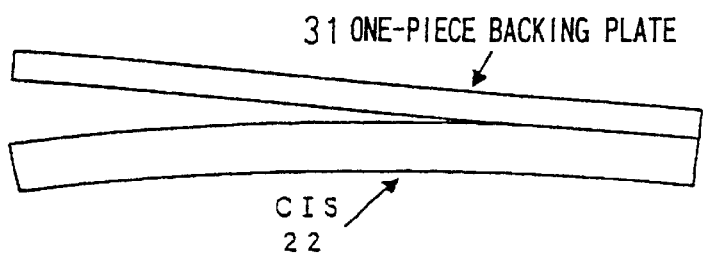
Figure 4D:
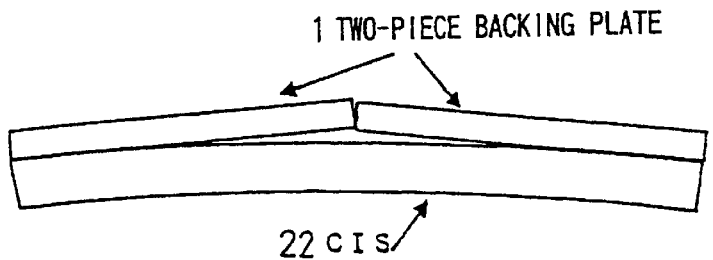
Figure 4E:
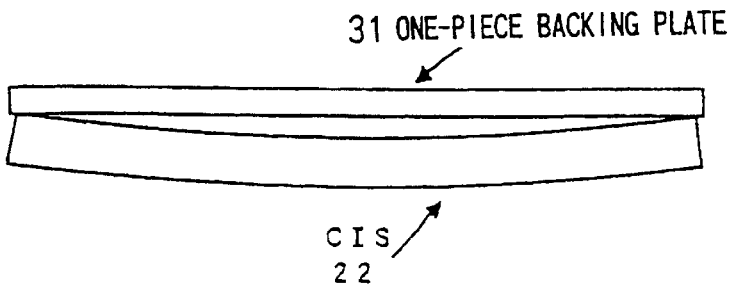
Figure 4F:
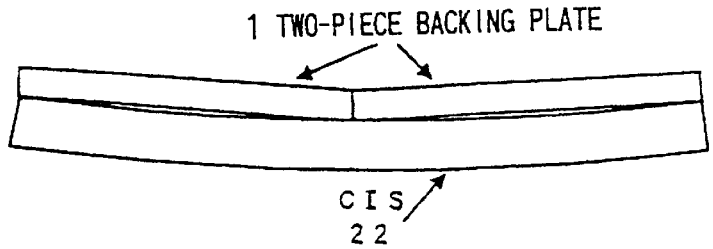

With the image reading apparatus having the above construction, when the CIS 22 is curved to have a central part thereof bulging upward and the CIS 22 and the backing plate contact each other in the central region, a conventional one-piece backing plate 31, as shown in FIG. 4A, would form large gaps with the CIS 22. However, where the above two-piece backing plate 1 is employed, and assuming that each part of the backing plate 1 contacts the CIS 22 in the central region of the backing plate 1, as shown in FIG. 4B, the lifting of each part of the backing plate 1 is reduced to about ¼ of what is shown in FIG. 4A. Furthermore, when the CIS 22 is curved to have the central part thereof bulging upward and the CIS 22 and the backing plate contact each other in an end region, the conventional one-piece backing plate 31, as shown in FIG. 4C, would form a large gap at the opposite end region with CIS 22. However, as shown in FIG. 4D, the lifting of each part of the two-piece backing plate 1 is reduced to about ¼ of what is shown in FIG. 4C. When the CIS 22 is curved to have the central part thereof recessed, the conventional one-piece backing plate 31, as shown in FIG. 4E, would form a large gap in the central region with the CIS 22. However, as shown in FIG. 4F, the lifting of each part of the two-piece backing plate 1 is reduced to about ¼ of what is shown in FIG. 4E.

Thus, by dividing the backing plate into a plurality of parts in the main scanning direction, the lifting of an original may be reduced drastically, thereby suppressing blooming of its image read.

An operation of the image reading apparatus having the above construction for compensating for shading with the two-piece backing plate 1 will be described next.

When compensating for shading with the two-piece backing plate 1, the division of the backing plate 1 produces a black line or the like, failing to provide correct reference data. As a method of compensation, a shading reference waveform is obtained by interpolating a waveform of an area read properly, other than the division. That is, in reading an image by CIS 22, the reference waveform fluctuates at intervals of rod lenses. This feature is taken into account and, for example, the bottoms of the waves are extended to form an original waveform for interpolation. The waveform fluctuating with the rod lenses is superposed on the original waveform. In this way, a final shading reference waveform may be obtained easily.

Next, an operation of the image reading apparatus having the above construction for compensating for the division of the backing plate 1 read as a black line when the division is off the forward end or rearward end of an original will be described with reference to the flow chart shown in FIG. 5.

After the operation is started at step S1, the original is read line by line at step S2, and black pixels are added up for areas other than the division at step S3. When the number of black pixels is found smaller than a specified number at step S4, it is determined that the pixels are of an area ahead of the forward end of the original or an area following the rearward end. Then, the operation proceeds to step S6 where the black pixels, even of the division, are changed to white. The operation returns to step S2 to read a next line. If the number of the black pixels is found larger than the specified number at step S4, it is determined at step S5 that the pixels are of the original, and the image read is passed on to a next process. Similarly, when the area following the rearward end of the original is read and the result of step S4 is "NO", step S6 is executed to change the black pixels of the division of the two-piece backing plate to white. While lines remain to be read, step S7 results in "NO" and the operation returns to step S2 to read a next line. When all lines have been read, the result of step S7 becomes "YES" and the reading operation is ended at step S8. In this way, the above operation avoids misreading of the division of two-piece backing plate 1 as a black line when the division is off the forward or rearward end of an original.

The operation controls described above reflect the simplest method. A compensation may be made with a higher degree of precision, for example, by adding other information and determining the forward and backward ends of an original based on another routine.

The above embodiment has been described as using a two-piece backing plate divided into two parts in the main scanning direction of CIS 22 (perpendicular to the direction of movement of an original). This embodiment is not limitative, but the backing plate may be divided into three or more parts. The greater is the number of parts into which the backing plate is divided, the smaller gap is formed between the backing plate and CIS 22. However, the black line resulting from the gap read would require a more complicated compensation.

Further, the above embodiment has been described as dividing the backing plate, which is not limitative. Instead of dividing the backing plate, as shown in FIG. 6, a backing plate 11 formed of a flexible material may be placed along the CIS 22 to prevent blooming. In this instance, the flexible backing plate 11 may be pressed on the CIS 22 as in the foregoing embodiment. The use of this type of flexible backing plate 11 eliminates the necessity to revise the shading compensation or to correct images read, which will result in a further cost reduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image reading apparatus comprising:

a contact image sensor; and a backing plate disposed to be opposite to the contact image sensor, the backing plate being divided into two parts in a main scanning direction of the contact image sensor, an original being passed between the contact image sensor and the backing plate so that the apparatus reads an image from the original.

2. The image reading apparatus of claim 1, comprising:

pressing means for pressing the backing plate against the contact image sensor.

3. The image reading apparatus of claim 1, comprising:

shading compensation means which uses white color of the backing plate as a reference for performing a shading compensation, the shading compensation means interpolating, into a division of the backing plate, reading data of adjacent white areas among reading data obtained by the contact image sensor.

4. The image reading apparatus of claim 1, comprising:

compensation means which is operable, when reading data of areas other than a division of the backing plate, among reading data obtained by the contact image sensor, represents white color of the backing plate, for interpolating reading data of adjacent white areas or data representing the white color into the division of the backing plate.

5. An image reading apparatus comprising:

a contact image sensor; and a backing plate disposed to be opposite to the contact image sensor, the backing plate being divided into at least three parts in a main scanning direction of the contact image sensor, an original being passed between the contact image sensor and the backing plate so that the apparatus reads an image from the original.

* * * * *